United States Patent [19]

Knox et al.

[11] Patent Number: 5,526,155
[45] Date of Patent: Jun. 11, 1996

[54] HIGH-DENSITY OPTICAL WAVELENGTH DIVISION MULTIPLEXING

[75] Inventors: Wayne H. Knox, Rumson; David A. B. Miller; Martin C. Nuss, both of Fair Haven, all of N.J.

[73] Assignee: AT&T Corp., Murray Hill, N.J.

[21] Appl. No.: 151,441

[22] Filed: Nov. 12, 1993

[51] Int. Cl.⁶ .................................................... H04J 14/00
[52] U.S. Cl. .......................... 359/130; 370/69.1; 359/124
[58] Field of Search ..................................... 359/124, 126, 359/130, 159, 161, 175, 193, 194, 195, 110, 111, 115, 116, 124, 129, 130; 356/305, 329, 301; 379/5, 6, 10, 31, 50; 375/3.1, 10; 385/18, 31, 37, 33; 370/69.1, 108, 107, 100.1

[56] References Cited

U.S. PATENT DOCUMENTS

| | | | |
|---|---|---|---|
| 3,080,788 | 3/1963 | Saunderson | 356/329 |
| 3,765,769 | 10/1973 | Treacy | 356/79 |
| 3,873,825 | 3/1975 | Jones et al. | 250/199 |
| 4,592,043 | 5/1986 | Williams | 370/3 |
| 4,744,618 | 5/1988 | Mahlein | 359/115 |
| 4,866,699 | 9/1989 | Brackett et al. | 370/3 |
| 5,157,652 | 10/1992 | Walker | 370/14 |
| 5,228,103 | 7/1993 | Chen et al. | 385/14 |
| 5,347,525 | 9/1994 | Faris | 372/19 |
| 5,363,221 | 11/1994 | Sutton et al. | 359/124 |

OTHER PUBLICATIONS

J. A. Salehi, et al., "Coherent Ultrashort Light Pulse Code–Division Multiple Access Communication Systems", Journal of Lightwave Technology, vol. 8, No. 3, pp. 478–491, Mar. 1990.

A. M. Weiner, et al., "Encoding and Decoding of Femtosecond Pulses", Optics Letters, vol. 13, No. 4, pp. 300–302, Apr. 1988.

O. E. Martinez, "3000 Times Grating Compressor with Positive Group Velocity Dispersion: Application to Fiber Compensation in 1.3–1.6 μm Region", IEEE Journal of Quantum Electronics, vol. 23, No .1, pp. 59–64, Jan. 1987.

C. Dragone, "An N×N Optical Multiplexer Using a Planar Arrangement of Two Star Couplers", IEEE Photonics Technology Letters, vol. 3, No. 9, pp. 812–815, Sep. 1991.

Primary Examiner—Hezron E. Williams
Assistant Examiner—Richard A. Moller

[57] ABSTRACT

The present invention provides an apparatus and method for high-density optical wavelength division multiplexing (WDM) using a single optical source. An optical wavelength division multiplexer in accordance with the present invention includes an optical source providing an optical pulse signal. A wavelength splitter separates the optical pulse signal spectrum into a plurality of channel signals at different wavelengths such that each channel signal may be separately modulated or otherwise processed. A wavelength combiner then recombines the separately modulated channel signals to provide a high-density WDM optical signal particularly well-suited for use in optical circuit interconnection and optical communication network applications. The high-density single-source multiplexer of the present invention may also be conveniently adjusted to align channel signal wavelengths or to compensate for optical fiber dispersion.

24 Claims, 5 Drawing Sheets

HIGH-DENSITY OPTICAL WAVELENGTH DIVISION MULTIPLEXING

BACKGROUND OF THE INVENTION

1. Field of the Invention

The present invention relates generally to improvements in optical systems. More particularly, the present invention relates to improvements in wavelength division multiplexing (WDM) of optical signals.

2. Description of Prior Art

The transmission capacity of optical communication systems is presently limited by the optical source modulation bandwidth. Although optical fiber has a very broad transmission bandwidth, on the order of 10 to 20 THz, the system data rates transmitted over the fiber are presently limited to about 2.5 Gbits/sec for single-channel communication using typical optical sources such as wavelength-tuned distributed feedback (DFB) lasers. Wavelength division multiplexing (WDM) generally increases optical system capacity by simultaneously transmitting data on several optical carrier signals at different wavelengths. With simultaneous data transmission on each channel, the total system capacity is increased by a factor equivalent to the number of different wavelength channels.

As used herein, the term "WDM system" will generally refer to a system capable of simultaneously transmitting data on several wavelength channels. Other optical systems may utilize a single optical source to transmit data over several different wavelength channels at different times. Since usually only a single channel signal is transmitted at a given time in these other systems, the overall system capacity is not increased relative to that of a single-channel system. Thus, although certain optical sources may be tuned over a broad bandwidth, such that a single source could be used to transmit on several wavelength channels, the modulation bandwidth of the source still limits the total transmitted data rate.

Prior art WDM systems, which simultaneously transmit data signals on several channels, therefore generally include a separate optical signal source for each channel. For example, an array of laser diode signal sources may be used in a WDM system, with each laser diode source individually modulated by a different data stream. The modulated optical carrier signal wavelengths provided by the laser diode array are typically spaced evenly apart within the bandwidth of the optical fiber. The individually-modulated channel signals may be combined in an optical coupler or combiner and then supplied to one end of an optical fiber transmission path. At the other end of the fiber, a separate optical receiver is generally used for each of the wavelength channels. Each receiver typically includes an input filter tuned to a particular channel signal carrier wavelength, and a photodetector for demodulating the carrier signal to recover the original data stream.

Despite the substantially higher fiber bandwidth utilization provided by WDM systems, a number of serious problems must be overcome if these systems are to become commercially viable. For example, each optical source typically requires active stabilization in order to prevent cross-talk or overlap between adjacent channel signals. Currently available systems are usually actively stabilized at both the transmitter and the receiver. Additional system hardware and processing may be required to independently stabilize each channel source.

Another problem with existing WDM systems is the effect of chromatic dispersion. In optical fiber, for example, dispersion causes optical channel signals at different wavelengths to propagate through the fiber at different speeds. As a result, the data streams modulated on the different carrier wavelengths undergo relative time shifts, and system synchronization is therefore difficult to maintain. Known dispersion compensation techniques include placing sections of fiber with an offsetting dispersion characteristic in the fiber transmission path. This static compensation may alleviate dispersion in systems in which each channel signal travels the same distance. However, presently available techniques cannot provide adequate dispersion compensation in, for example, a practical optical network where each of the channel signals may have travelled through a different length of fiber.

The number of possible channels in prior art WDM systems may be limited in certain practical implementations. For example, the complexity of individually-stabilized laser diode sources limits practical laser diode arrays to about 10 to 20 diodes. In addition, the most efficient currently available photonic integrated circuits can be formed with only about four laser sources on a single chip. Packaging and source complexity constraints therefore represent a significant problem in present multi-source WDM systems. The complexity of each source also substantially increases the overall optical system cost. Although a large number of sources may permit large numbers of channels in principle, these practical considerations presently limit the channel density of WDM systems to about 20 channels or less.

The above problems limit use of bandwidth efficient WDM techniques in many applications. For example, optical interconnections between electronic circuits can provide a number of advantages, including lower cost, better flexibility, elimination of ground loops, reduced cross-talk, lower dissipation and improved signal-to-noise performance. However, optical interconnections typically involve a large number of different data signals, each of which may need to be modulated on a different channel signal. The different channel signals may then be passed through an optical transmission medium to another electronic circuit, where they are individually detected and converted to electrical signals for further processing. A separate optical source is generally required for each high-speed data signal to be interconnected. Very large scale integrated (VLSI) circuits, which may have a hundred or more high-speed signal lines requiring interconnection, would therefore need a prohibitively large number of sources to make use of WDM interconnects.

Although time domain multiplexing (TDM) of several lower data rate signal lines into a single high-speed data line might reduce the total number of sources required for WDM interconnects, high-speed electronic multiplexers are usually needed to perform this function. In modern high data rate VLSI circuits, optical source bandwidth limitations will generally permit TDM of only a few data signal lines for each source. In addition, clock skew problems may result because dispersion causes each optical channel wavelength to travel at a different speed through an optical fiber. It is therefore difficult to obtain the considerable advantages of optical interconnects using presently available WDM techniques.

As is apparent from the above, a need exists for efficient WDM of a large number of simultaneously-transmitted optical signals using only a single optical source, thereby avoiding the substantial cost, complexity, stabilization and dispersion compensation problems of the prior art, and permitting use of high-density WDM in applications such as optical interconnects and optical communication networks.

SUMMARY OF THE INVENTION

The present invention provides an apparatus and method for generating a wavelength division multiplexed (WDM) optical signal, with several simultaneously-transmitted channel signals, using a single optical source. The optical wavelength division multiplexer of the present invention includes an optical source providing an optical pulse signal with a broad frequency spectrum. A wavelength splitter separates the pulse signal spectrum into several channel signals, each of which may be separately and simultaneously modulated by a different time-varying data stream or information signal. The separately modulated channel signals are recombined in a wavelength combiner to provide a wavelength division multiplexed optical signal. A single optical source can thus be used to generate a high density of multiplexed, simultaneously-transmitted optical channel signals.

In accordance with one aspect of the present invention, an optical source with a femtosecond output pulse duration may be used, such that a hundred or more channel signals can be generated from the pulse spectrum, with each channel signal typically including many different longitudinal modes of the optical source. Other types of optical pulse signals may also be used to generate appropriate channel signals in a given WDM application.

In accordance with another aspect of the present invention, a single-source optical WDM may be used for optical interconnection of high-speed electronic circuits. For example, a first circuit could include a number of optical modulators which receive the individual channel signals from a wavelength splitter and separately modulate each channel signal with a first circuit data signal. Again, a wavelength combiner is used to recombine the separately modulated channel signals. The recombined channel signals travel through an optical transmission medium, such as fiber or free space, to a second electronic circuit. The second circuit includes optical detectors for demodulating the incoming channel signals to recover the first circuit data signals, which are then supplied to appropriate points on the second circuit. The present invention thus provides simultaneous optical interconnection of several high-speed electronic circuit data signals using only a single optical source.

In accordance with another aspect of the present invention, a method of high-density optical wavelength division multiplexing is provided which facilitates alignment of channel signal wavelengths and compensation for chromatic dispersion in the transmission medium. The method includes the steps of providing an optical pulse signal; splitting a spectrum of the optical pulse signal into several channel signals; separately modulating at least one of the channel signals; recombining the channel signals in a wavelength combiner to provide a wavelength division multiplexed optical signal; and adjusting a position of one or more of the wavelength splitter, the wavelength combiner, or the modulator until a desired level of power in a harmonic of the recombined signal is detected in an optical harmonic detector. In order to align channel signal wavelengths, the position of the splitter, combiner or modulator is adjusted in a direction substantially perpendicular to the optical channel signal propagation direction while a different bit of a pseudo-random code is modulated onto each of the channel signals. To compensate for chromatic dispersion in the transmission medium, the position of the splitter, combiner or modulator is adjusted in a direction substantially parallel to the optical channel signal propagation direction while a constant level signal is modulated on each of the channel signals.

As a feature of the present invention, a large number of simultaneously-transmitted optical channel signals may be wavelength division multiplexed using only a single optical source. A substantially larger portion of the transmission bandwidth of an optical medium, such as optical fiber, can now be efficiently utilized. The considerable cost and complexity associated with existing WDM systems is avoided. It is no longer necessary to tune and stabilize a large number of different optical sources in order to take advantage of the broad transmission bandwidth WDM provides.

As another feature of the present invention, high-density single-source WDM maintains a fixed phase relationship between the different wavelength channel signals of the WDM signal. As a result, it is possible to perform efficient channel stabilization and dispersion compensation on the WDM signal. The present invention thus provides techniques for avoiding major problems with existing WDM systems.

As an additional feature of the present invention, high-density single-source WDM is no longer impractical in particular applications or implementations. For example, since only a single optical source is used, the present invention may be readily implemented as a photonic integrated circuit. Furthermore, the invention is suitable for use in a wide variety of applications, including, for example, optical interconnects and optical communication networks.

The above-discussed features, as well as additional features and advantages of the present invention, will become more readily apparent by reference to the following detailed description and the accompanying drawings.

DETAILED DESCRIPTION

The present invention provides a single-source optical wavelength division multiplexer (WDM) suitable for use in a wide variety of optical applications. The present invention substantially reduces the need for multiple optical sources in broadband WDM systems and addresses the channel alignment and dispersion compensation problems of the prior art. Although the following description is primarily directed to two particular optical applications, optical interconnects and optical networks, it should be recognized that the present invention is applicable to other optical applications as well.

Figure 1A:
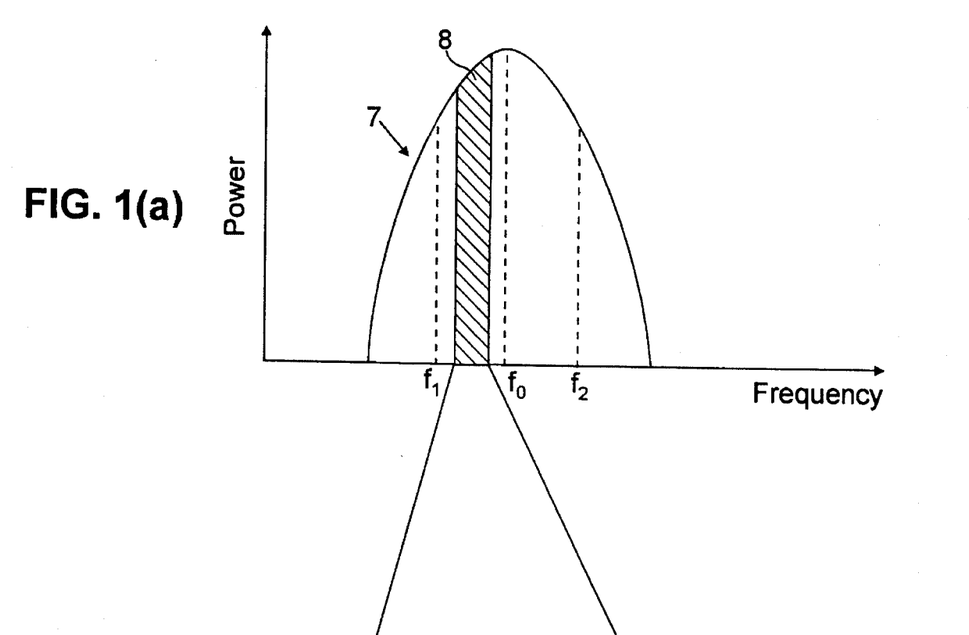
FIG. 1(a) is an exemplary frequency spectrum of an optical pulse signal.

FIG. 1(a) shows an exemplary frequency spectrum 7 of an optical pulse signal. It should be noted that the terms frequency and wavelength will be used interchangeably herein to refer to optical signal spectra. The optical spectrum of FIG. 1(a) is shown in terms of frequency in part because future CCITT standards for WDM systems may specify a channel signal frequency spacing, such as, for example, a 50 GHz or 100 GHz spacing between the center frequencies of adjacent channels. As mentioned above, the bandwidth of an optical fiber transmission path is about 10 to 20 THz. A single optical source, however, generally has a modulation bandwidth of only about 2.5 GHz. By multiplexing several continuously-modulated optical signals, each having a modulation bandwidth of about 2.5 GHz, onto a single optical fiber, a substantially larger portion of the available fiber bandwidth may be utilized. Conventional WDM utilizes several different optical channel signals, each typically having a different carrier wavelength. The modulated channel signals together occupy a larger bandwidth and therefore better utilize the available fiber bandwidth.

The spectral bandwidth of a WDM system may be represented by, for example, the frequency range $f_1$ to $f_2$ in FIG. 1(a). As discussed above, however, increased bandwidth utilization using known WDM techniques typically requires several individually tuned and stabilized optical sources. Practical constraints limit the number of optical signal sources to about twenty, each with a modulation bandwidth of about 2.5 GHz, and therefore limit total achievable WDM bandwidth to about 60 GHz. The present invention, however, uses a single broad bandwidth optical signal source to provide multiple WDM channel signals. The bandwidth of an optical pulse signal is generally inversely proportional to the pulse duration. For example, an optical signal source which supplies a train of short optical pulses will have a broad bandwidth frequency spectrum. If the pulse duration is about 100 femtoseconds ($100 \times 10^{-15}$ seconds), the width of a usable portion of the frequency spectrum 7 in FIG. 1(a), *measured from frequencies $f_1$ to $f_2$, is about 3 THz.* Although the exemplary frequency spectrum 7 of FIG. 1(a) is shown as a continuous spectrum, the spectrum is actually composed of many different wavelength components, or discrete longitudinal modes of the optical source. For a typical optical pulse signal, these longitudinal modes will be reduced in amplitude for frequencies below $f_1$ or above $f_2$. Because it is usually desirable to have significant optical signal power in the portions of the pulse signal spectrum used for channel signals, only part of the total spectrum 7, such as the range $f_1$ to $f_2$, may be useful in a given application. It should be understood that the shape of frequency spectrum 7 is simplified for illustration purposes, and that the actual shape of an optical pulse signal spectrum may vary considerably depending upon various signal characteristics.

Figure 1B:
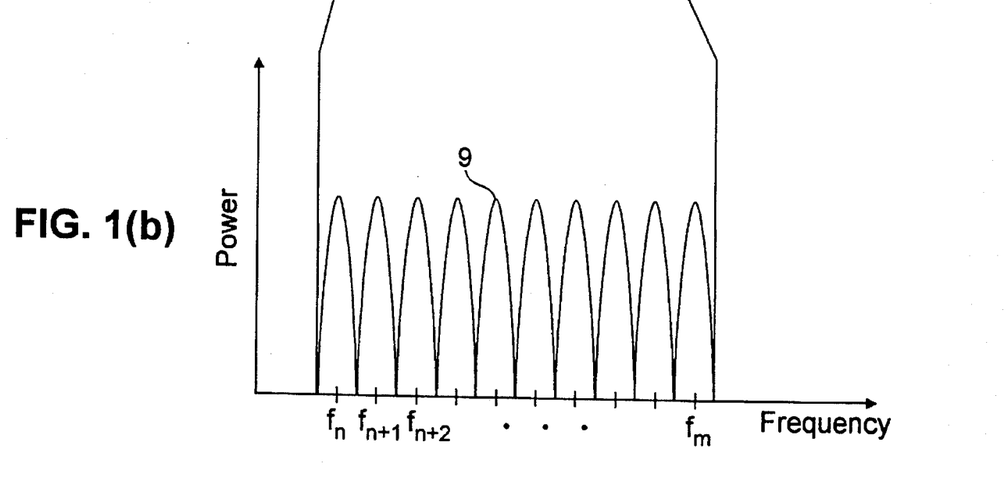
FIG. 1(b) is a more detailed view of an exemplary portion of the spectrum in FIG. 1(a), illustrating a plurality of optical channel signals in accordance with the present invention.

FIG. 1(b) is a more detailed illustration of an exemplary portion 8 of the pulse signal spectrum 7 in FIG. 1(a), separated into several channel signals. The portion 8 of the pulse signal spectrum 7 lies within the frequency range $f_1$ to $f_2$ and includes a number of different channel signals 9. The channel signals 9 are separated as shown by, for example, passing the optical pulse signal with the spectrum of FIG. 1(a) through a wavelength splitter, in a manner to be described in greater detail below. As noted above, the spectrum 7 includes a large number of discrete longitudinal modes. By passing the pulse signal through a wavelength splitter, such as a diffraction grating, the longitudinal modes in spectral portion 8 may be separated into several channel signals 9. Each channel signal 9 typically includes many different longitudinal modes of the source. However, a channel signal could include fewer longitudinal modes when, for example, a high repetition rate source is used, since the modes will then be spaced further apart in frequency. A channel signal in accordance with the present invention, therefore, is not made up of a predetermined set of source longitudinal modes, but is instead a portion of the spectrum which is separated by a wavelength splitter and is incident on, for example, a particular channel modulator.

Figure 2:
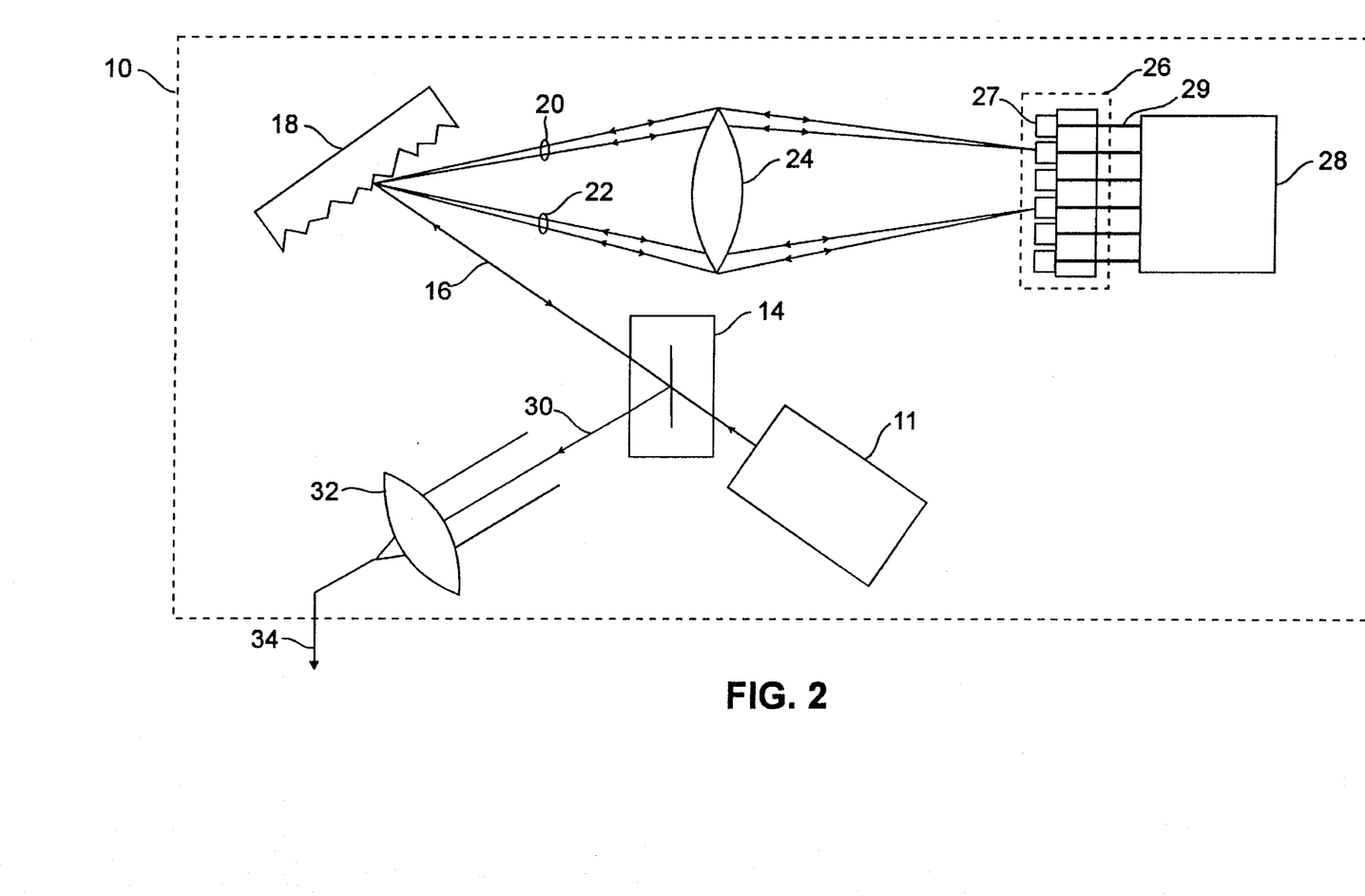
FIG. 2 is a block diagram of an exemplary single-source optical wavelength division multiplexer in accordance with the present invention.

FIG. 2 is block diagram of an exemplary single-source optical wavelength division multiplexer 10 in accordance with the present invention, suitable for use in a variety of optical applications. The multiplexer 10 includes an optical source 11 which provides an optical pulse signal 12 on its output. The optical source 11 may be, for example, a pulsed or a mode-locked laser. The optical pulse signal may include a train of optical pulses, with the optical pulses having a certain pulse shape. A variety of different pulse shapes may be used, including, for example, a Gaussian pulse shape or a secant-hyperbolic pulse shape. The optical pulses in the exemplary optical pulse signal are typically repeated at a particular pulse repetition rate. The pulse repetition rate required for a given application may vary widely, and may be, for example, between about 100 MHz and 2.5 GHz. Other pulse repetition rates, up to 350 GHz or more, could also be used. The pulse duration may be varied to obtain a frequency spectrum capable of providing a desired number of channel signals. As explained further below, the number of channels which the pulse frequency spectrum may be separated into depends upon the width of the spectrum. Although pulse durations in the sub-picosecond range are preferred for many applications requiring a large number, or a high density, of channel signals, pulse durations longer than 1.0 picosecond may also be used.

The optical pulse signal passes over a beam pick-off mirror 14. The beam pick-off mirror is arranged such that an optical signal from source 11 passes unreflected over an edge of the mirror, but an optical signal returning toward the source 11 may be picked off by the mirror and reflected in a direction away from the source. Use of the pick-off mirror 14 minimizes optical signal loss. In applications in which additional optical signal loss is acceptable, a beam splitter could be used in place of pick-off mirror 14. A portion 16 of the pulse signal 12 out of pick-off mirror 14 is incident on a wavelength splitter 18 which divides the pulse signal spectrum into a plurality of channel signals. The wavelength splitter may be a diffraction grating or other suitable wavelength splitter, such as a Dragone wavelength router. The Dragone router is described in, for example, C. Dragone, "An NxN Optical Multiplexer Using a Planar Arrangement of Two Star Couplers," IEEE Photonics Technology Letters, Vol. 3, No. 9, pp. 812–815, September 1991. The individual channel signals, or portions of the pulse signal spectrum, are reflected from the diffraction grating 18. The paths traveled by two exemplary channel signals 20, 22 are shown in FIG. 2. The channel signals may then be separately processed in any manner required by a particular application.

In the exemplary embodiment shown, the channel signals are focused on a modulator array 26 by a lens 24, and are separately processed by modulating each channel signal incident on the modulator array 26 with, for example, a data signal from an electronic circuit 28. The modulator array 26 includes a plurality of individual channel signal modulators 27, which may be reflection-mode quantum well modulators. Other types of modulators, including, for example, electro-optic or acousto-optic modulators, could also be used. Each of the channel signals is incident on one modulator 27 in the array 26. One or more data signals are supplied from the circuit 28 along lines 29 to the modulators 27. The data signals on the lines 29 may be high-speed electrical signals at data rates of up to 2.5 Gbits/sec or higher, or other types of digital or analog signals from circuit 28. The data signals are generally time-varying signals, although various constant signal levels may also be used as data signals in a given application. However, maximum WDM system data capacity is obtained by using data signals which vary at the highest data rate supported by each channel signal.

The data signals on the lines 29 are modulated onto the various channel signals within modulator array 26. The exemplary modulators 27 of array 26 operate in the reflection mode. In a reflection-mode modulator, the channel signal incident on each modulator 27 is modulated by a data signal and then reflected out of the modulator back toward the lens 24. The lens 24 focuses the various channel signals onto diffraction grating 18, which recombines the channel signals into a single WDM optical signal. The WDM signal includes a number of separately modulated channel signals, with each channel signal typically including many longitudinal modes of the optical pulse signal source. The WDM signal travels from the diffraction grating 18 back toward the pick-off mirror 14, where it is reflected and travels along path 30 toward lens 32. In order for the pick-off mirror 14 to reflect the optical WDM signal returning from grating 18, while the unmodulated optical pulse signal from source 11 passes unreflected over the mirror, it may be necessary to tilt the grating 18 or the array 26 such that the WDM signal returns toward source 11 on path below that travelled by the unmodulated pulse. Lens 32 focuses the reflected WDM signal onto an optical transmission medium 34, which may be free space, optical fiber, or different types of waveguides, such as, for example, a polymer waveguide. The multiplexer 10 of FIG. 2 therefore provides a multi-channel optical WDM signal using only a single optical source 11. The WDM signal out of lens 32 may be used in a variety of optical applications, including optical interconnections and optical communication networks.

In the exemplary embodiment of FIG. 2, a reflection-mode modulator is used, and thus a single diffraction grating 18 may serve as both a wavelength splitter and a wavelength combiner. The modulated channel signals are reflected back toward the grating 18 by the reflection-mode modulator array 27, and the grating 18 then recombines the modulated channel signals into a single optical signal which may be propagated down an optical fiber. As previously noted, other types of modulators, including non-reflective modulators, may also be used. With a non-reflective modulator, a separate wavelength combiner may be used after the modulator array in order to recombine the modulated channel signals of the optical WDM signal.

In an optical interconnect application, it may be desirable to connect the data signals from a first circuit, such as circuit 28 in FIG. 2, to another circuit. For example, the first circuit may contain a signal generator which supplies timing signals to another circuit. The circuits may be, for example, silicon or gallium arsenide electronic circuits operating at high signal speeds. Prior art interconnection of high-speed electronic circuits would typically rely upon direct electrical interconnection using, for example, high-speed coaxial cable. As previously mentioned, however, direct electrical interconnection may also create a number of problems, including high cost, inflexibility, ground loops, cross-talk between the cables, reduced signal-to-noise ratio and excessive power dissipation.

Figure 3:
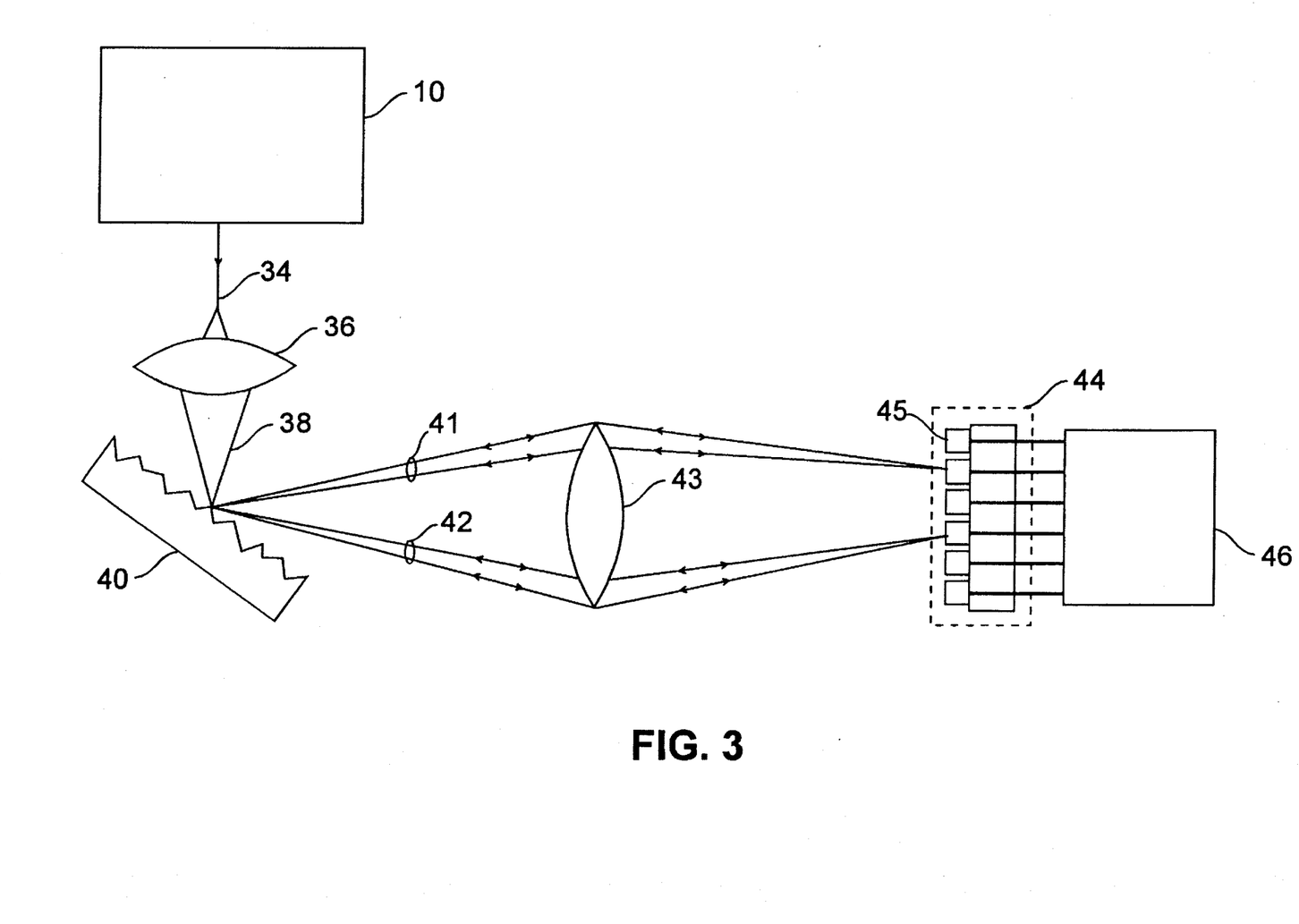
FIG. 3 is a block diagram illustrating the use of a single-source optical wavelength division multiplexer in an optical interconnection application.

An exemplary embodiment of an optical interconnection system using a single-source WDM 10 in accordance with the present invention is shown in FIG. 3. As discussed in connection with FIG. 2, the multiplexer 10 provides an optical WDM signal to an optical transmission medium 34. The optical source 11 may be synchronized to a signal, such as a clock, from one of the circuits to be interconnected, such as first circuit 28. The optical transmission medium may be optical fiber or free space, and is used to interconnect data signals from two or more circuits. Optical fiber will be used as the transmission medium 34 in this example. In FIG. 3, a lens 36 receives the optical WDM signal from the optical fiber 34 and focuses the WDM signal onto a second wavelength splitter 40. The second wavelength splitter may be, for example, a diffraction grating or a Dragone wavelength router. In the exemplary embodiment shown, a diffraction grating 40 is used as a wavelength splitter.

The diffraction grating 40 splits the WDM signal into several channel signals with different longitudinal modes. Two exemplary channel signals travel along the paths 41, 42. The channel signals on paths 41, 42 are focused via lens 43 onto a detector array 44 which includes a plurality of optical detectors 45. One of the modulated channel signals of the optical WDM signal is incident upon each optical detector. The detectors may be positive-intrinsic-negative (PIN) photodiodes, or other suitable optical detectors. The detectors 45 demodulate each of the incoming channel signals to, for example, recover the data signals from first circuit 28. The demodulated data signals may then be supplied to, for example, data signal inputs on second circuit 46. A single optical source may thus be used, in accordance with the present invention, to interconnect two or more high-speed electronic circuits. When interconnecting more than two circuits, optical amplifiers may be needed to overcome signal loss due to splitting or coupling the WDM signal to supply it to the additional circuits.

Although the exemplary embodiment of FIG. 3 illustrates optical interconnection of data signals from a first circuit to data signal inputs on a second circuit, many other alternative arrangements will be apparent to those skilled in the art. For example, data signals may also be sent from the second circuit, and received in the first circuit, by switching the modulators and detectors of the circuits corresponding to particular WDM channels. Since the modulators operate in reflection mode, an unmodulated channel signal incident on a modulator placed at a particular channel position in the detector array 44 could be modulated by a data signal from second circuit 46. The modulated channel signal could then travel back through the lens 43, diffraction grating 40, lenses 36, 32, beam pick-off mirror 14, diffraction grating 18, and lens 24, and be incident upon an element of array 26 in a particular channel position. The modulator element in array 26 could then be replaced with an optical detector, such that the incident modulated channel signal may be demodulated to supply the data signal from the second circuit 46 to a desired point on the first circuit 28. Alternatively, both modulators and detectors for each channel signal could be included on each circuit, with an optical switch for directing a particular channel signal to either a modulator or a detector. As noted above, the data signals from one circuit may be connected to several different circuits by using a beam splitter or an optical coupler at the output of multiplexer 10. The beam splitter or coupler may be used to supply the optical WDM signal to additional circuits or systems as required in a given application. An amplifier could be included at the beam splitter or coupler output, to offset optical signal loss.

Figure 4A:
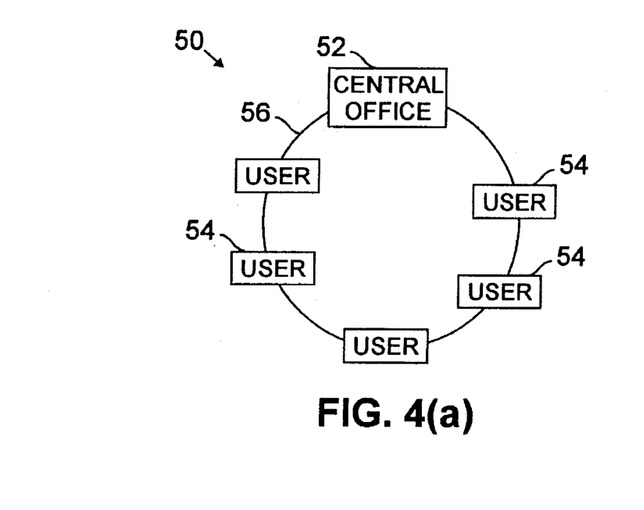
FIG. 4(a) is a block diagram of an exemplary optical communication network in which a single-source optical WDM of the present invention may be used.

FIG. 4(a) is a block diagram of an exemplary optical communication network 50 in which the single-source optical WDM of the present invention may be used. The optical communication network 50 includes a central office 52 which contains an optical wavelength division multiplexer such as that described in conjunction with FIG. 2 above. The network also includes a number of user nodes 54 arranged in a ring configuration. The central office 52 and the various user nodes 54 are interconnected via optical fiber 56. Alternative network configurations could also be used, including the star configuration shown in FIG. 4(b). The optical WDM within the central office 52 includes an optical source, and may include an array of reflection-mode modulators and a single diffraction grating serving as both a wavelength splitter and a wavelength combiner. The multiplexer within central office 52 may therefore be, for example, the multiplexer 10 shown in FIG. 2. Other alternative multiplexer embodiments may also be used within central office 52. The central office 52 also includes other network processing hardware, such as data signal switching equipment.

The optical multiplexer within central office 52 may output an optical pulse signal with a pulse duration of about 1.0 picosecond to 100 femtoseconds or less. As noted above, the pulse duration is related to the bandwidth of the source output spectrum, and typically a larger number of channel signals may be accommodated using a pulse signal with a shorter pulse duration. The pulses are repeated at a pulse repetition rate, which may be equivalent to a fundamental data rate of the network. Within the central office 52, the optical pulse signal spectrum is divided into separate channel signals using a diffraction grating or another suitable type of wavelength splitter. Each channel signal may then be individually modulated. The channel signals may be recombined within the same diffraction grating if, for example, reflection-mode modulators are used. A WDM optical signal is therefore supplied from the single-source multiplexer within the central office 52 to the individual user nodes 54 on the communication network. Within each user node 54, the individual channel signals of the WDM signal may be selectively modulated or detected.

Figure 4B:
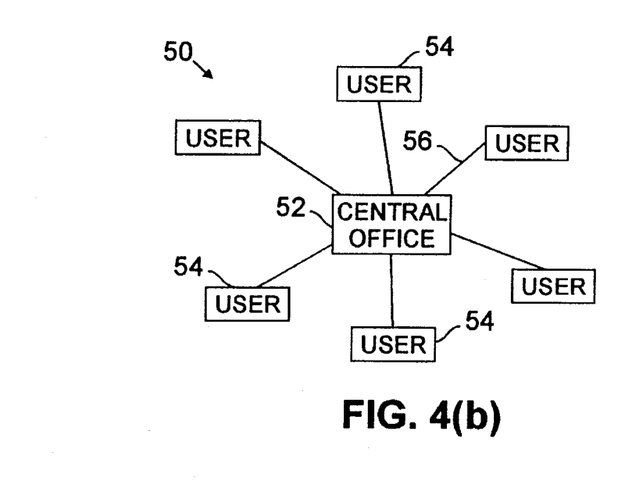
FIG. 4(b) is a block diagram of another exemplary optical communication network in which a single-source optical WDM of the present invention may be used.
Figure 5A:
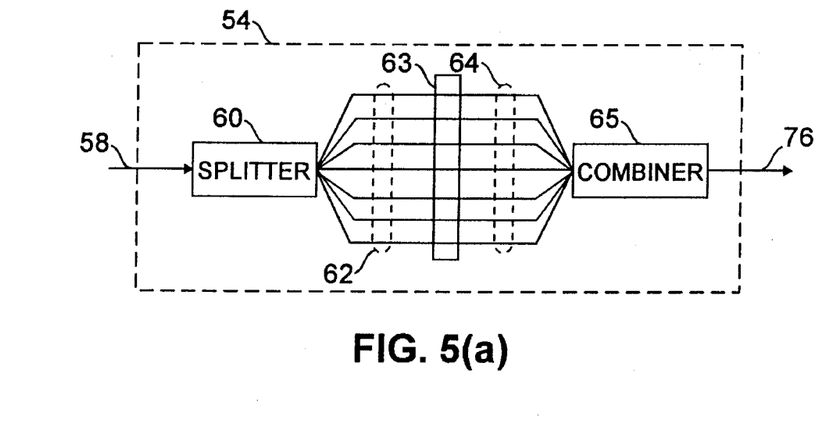
FIG. 5(a) is a block diagram of an exemplary user node in a single-source optical WDM communication network in accordance with the present invention.

FIG. 5(a) is a block diagram of an exemplary user node suitable for use as one of the nodes 54 in the single-source optical WDM communication networks of FIGS. 4(a) and 4(b). The user node 54 receives a WDM signal from the central office 52 on user node input 58. The WDM signal on input 58 represents the recombined channel signals of an optical pulse signal spectrum generated within the multiplexer in central office 52. The recombined channel signals of the WDM signal are again separated in a wavelength splitter 60 in the user node 54. The wavelength splitter 60 separates the incoming WDM signal into a plurality of channel signals which are spatially separated along paths 62. The channel signal of each path 62 may then be individually detected or modulated within an array 63. After modulation or detection in the array 63, the channel signals travel along paths 64 to a wavelength combiner 65 which recombines the channel signals into a single optical WDM signal at its output 66. This signal then propagates along the fiber 56 to another user node 54 or the central office 52. In this manner, each of the user nodes may transmit or receive information to or from the other user nodes or the central office using the various channel signals of the WDM signal. All of the channel signals need not be modulated within the central office or modulated and/or detected within any particular user node. The number of channel signals used, and the arrangement of modulator and detector elements within each array 63 of the user nodes 54, may vary considerably from network to network. It should be noted that the modulator and/or detectors of array 63 do not operate in a reflection mode in this embodiment. If reflection mode is used, wavelength splitter 60 and wavelength combiner 65 could be, for example, a single diffraction grating.

Figure 5B:
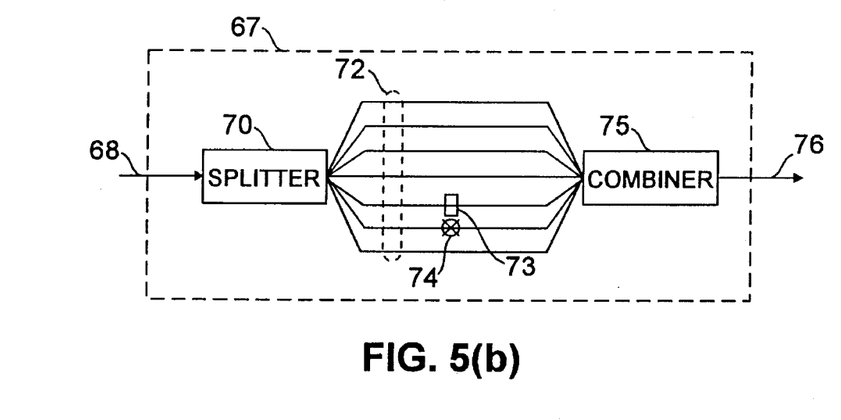
FIG. 5(b) is a block diagram of another exemplary user node in a single-source optical WDM communication network in accordance with the present invention.

FIG. 5(b) is a block diagram of another exemplary user node 67 suitable for use as one of the nodes 54 in FIGS. 4(a) and 4(b). In this exemplary user node, only certain channel signals are processed within the node. Other channel signals are simply separated and recombined, passing through the node without further processing. A WDM signal is supplied to an input 68 of the user node 67 from the central office 52 or another user node. The WDM signal is split into its channel signals in a wavelength splitter 70. Several of the individual channel signals, spatially separated and represented as travelling along paths 72, are not modulated or detected within user node 67, but instead pass directly to a wavelength combiner 75. One exemplary channel signal corresponding to one of the signal paths 72 is modulated in a modulator 73. The modulation or data signal used to modulate the particular channel signal in modulator 73 may be any data or information source associated with the particular user node 67. Wavelength combiner 75 recombines the various channel signals into a WDM signal, and places the recombined signal onto the optical fiber 56 via node output 76. In this manner, data or other information signals within each user node may be placed upon the communication network, and transmitted to other nodes or the central office, via one of the channel signals of the WDM signal.

A different channel signal corresponding to another signal path 72 within exemplary user node 67 is detected in an optical detector 74. The modulated channel signal is also recombined with the other channel signals and placed back on the network for transmission to other nodes or the central office via output 76 of the node 67. The user node 67 can thus be supplied with data or other information signals from the other nodes or the central office, via one of the channel signals of the WDM signal. It should be emphasized that the arrangement of modulators and detectors in FIG. 5(b) is exemplary only, and different numbers and arrangements of channel signals may be modulated, detected, processed or simply passed through the node unprocessed, as required in a given network application.

In the above single-source WDM communication network, the optical pulse signal source is located at the network's central office. Because each channel signal represents an available network channel, a large number of channels are available within the network. In addition, since each channel may independently handle a high-speed electronic data signal, the electronic switching speed requirements of the central office are significantly reduced. The network switching may be accomplished electronically in the central office at the lower data signal switching rates, while the multiplexing of channel signals multiplies overall network capacity by the number of channel signals used. For example, if an optical pulse signal with a duration of about 100 femtoseconds is used, up to 250 or more different channel signals may be generated from the pulse spectrum. By using 250 WDM channel signals, each carrying data at a 100 Mbits/sec data rate, the total data transmission capacity of the network is 25 Gbits/sec. The central office, however, need only operate at the data signal switching speed of 100 Mbits/sec. A total capacity of 25 Gbits/sec is high for a network with a central office operating at such a moderate switching speed.

In existing WDM systems, channel misalignment and fiber dispersion are serious problems. As mentioned above, present techniques for addressing these problems include active stabilization of the many individual optical sources at both the transmitter and the receiver, and using sections of fiber with an offsetting dispersion characteristic in the fiber transmission path. The techniques are generally inflexible and expensive to implement. The single-source optical WDM of the present invention maintains a fixed phase relationship between channel signals, which permits the use of inexpensive, accurate and flexible alignment and compensation techniques. The phase relationship between channel signals in the present invention is fixed because each channel signal is composed of longitudinal modes of the same optical signal source.

Figure 6:
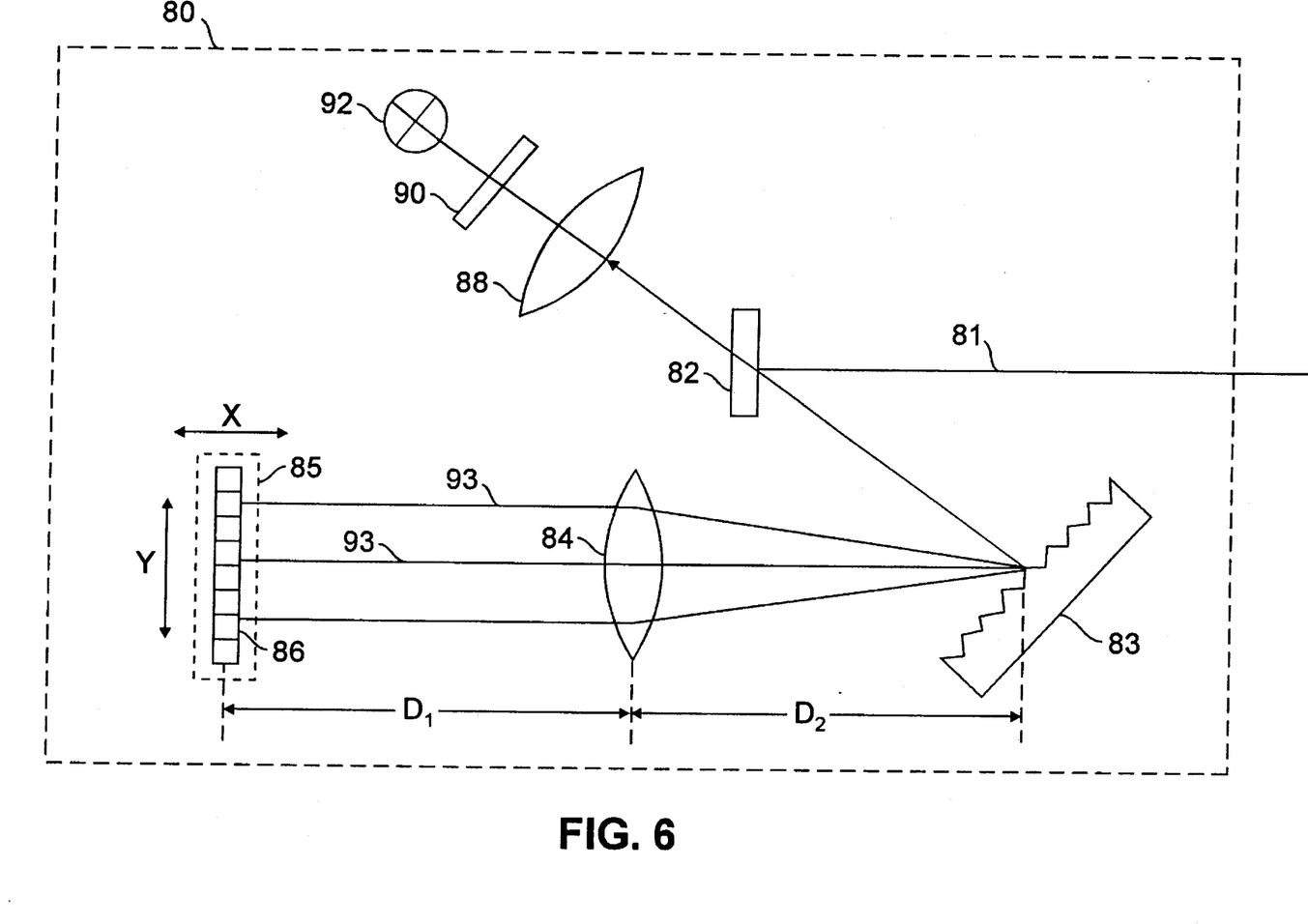
FIG. 6 is a block diagram of a user node of an optical WDM network with dispersion compensation and channel alignment capability in accordance with the present invention.

FIG. 6 is a block diagram of an exemplary user node 80 in a high-density single-source optical WDM network, with dispersion compensation and channel alignment capability in accordance with the present invention. An optical WDM signal arriving on user node input 81 is reflected off a beam pick-off mirror 82 toward a diffraction grating 83. A beam splitter could be used in place of mirror 82, but would generally result in greater optical signal loss. The diffraction grating 83 in user node 80 serves, in this embodiment, as both a wavelength splitter and a wavelength combiner. The beam pick-off mirror 82 is used to reflect optical WDM signals both into and out of the user node 80. The diffraction grating 83 separates the incoming optical WDM signal into its channel signals. The individual channel signals are spatially separated by the grating 83 and are incident on a lens 84, which focuses the spatially separated channel signals onto the appropriate modulator or detector in an array 85. The array 85 in the embodiment of FIG. 6 is an array of reflection-mode modulators 86. The diffraction grating 83 and the modulator array 85 are spaced apart by a distance $D_1+D_2$ in a direction X, the importance of which will be discussed below. The diffraction grating 83 may serve to separate the incoming optical signal pulse spectrum into various channel signals, as well as to recombine these channel signals after they are individually modulated within the modulator array 85. It should be noted that although the embodiment shown includes an array of modulators, the array could include modulators, detectors, other processing elements, or simply a reflector, at any or all of the array element positions. The beam pick-off mirror 82 reflects the recombined WDM optical signal to the user node output, also designated by reference numeral 81. In this particular embodiment, reflection-mode modulators are used and the user node input and output may therefore be the same.

By tilting grating 83 or array 85 slightly, the recombined WDM signal may be made to pass unreflected over the pick-off mirror 82 to a lens 88. The lens 88 focuses the optical WDM signal onto a nonlinear crystal 90, which generates optical signal harmonics in response to an incident optical signal. Other nonlinear devices, including optical four-photon mixers, semiconductor amplifiers, and lengths of dispersion-shifted fiber, may also be used to generate optical signal harmonics. A harmonic detector 92 provides a measure of the power level of a particular harmonic of the incident optical signal. In the exemplary embodiment shown, the harmonic detector 92 is preferably a second harmonic detector.

The power level of certain harmonics generated by the nonlinear crystal 90 indicate various characteristics of the incident optical signal. For example, if a short optical pulse signal is used to generate a single-source optical WDM signal, the characteristics of the recombined pulse signal are indicated by the amount of power at the pulse signal second harmonic. In general, a pulse signal which has sharp edges and is concentrated within a short duration of time will have greater power in its even harmonics than a signal which is spread in time by, for example, fiber dispersion. Of the even harmonics, the second harmonic will generally have higher power levels than the other even harmonics of the signal, such as the fourth and sixth harmonics. Although any of the harmonics of the incident optical signal could be used to indicate the quality of the arriving optical signal, the even harmonics, and in particular the second harmonic, provide a convenient and accurate signal quality measurement in a wide variety of applications.

In accordance with the present invention, an optical pulse signal spectrum is split into N different components, each of which may represent a distinct channel signal. The optical source delivers the pulses of the pulse signal at a particular repetition rate, on the order of the system or network data rate. For each of the pulses, the data modulated onto the N individual channel signals may be represented as a data word of length N associated with a particular pulse in the optical pulse signal. As mentioned above, once the pulse is modulated by a word of length N, the individual pulses of the optical pulse signals are spread out in time such that the pulse intensity at any one point in time is considerably reduced. This effect has been noted in the context of code-division multiple access (CDMA) communication with optical pulse signals. See J. Salehi et al., "Coherent Ultrashort Light Pulse Code-Division Multiple Access Communication Systems", Journal of Lightwave Technology, Vol. 8, No. 3, March 1990. When the channel signals of the WDM optical signal are modulated, the amount of second harmonic power generated by the nonlinear crystal will be relatively small. When each of the channel signals are unmodulated, or modulated with a constant high level, the optical pulse signal energy is concentrated within the pulse duration, and the second harmonic power will be relatively high.

Dispersion compensation of the single-source WDM optical signal may be performed as follows. During the normal operation of, for example, an optical network, the optical pulse signals are spread in time as a result of the time-varying data signals modulated onto the channel signals of the pulse. Fiber dispersion introduces additional time spreading as the signal propagates down the fiber. The amount of time spreading is a function of a variety of factors, including the length of fiber, its dispersion characteristic, and the channel signal wavelengths. At certain intervals in normal network operation, the dispersion effects may be isolated by modulating a constant high level on each channel signal, such that any time spreading effects due to channel signal modulation are removed. In effect, modulating a constant high level on each channel signal leaves the channel signals unmodulated, such that the original pulse shape is maintained. As the pulse propagates down the fiber, however, dispersion will continue to introduce time spreading of the pulse. Most or all of the pulse time spreading will therefore be due to dispersion, rather than a combination of dispersion and channel signal modulation effects.

During the intervals in which dispersion effects on the optical pulse are isolated as described above, an adjustment may be made to the positions of the modulator array 85 or the grating 83 relative to the lens 84. This position adjustment compensates for the dispersion-induced time spreading of the optical pulse. The positions are adjusted in a direction X which is substantially parallel to the direction of propagation along the channel signal path 93 at a point where the channel signals are incident on array 85. The effect of relative grating position on dispersion compensation is discussed in O. Martinez, "3000 Times Grating Compressor with Positive Group Velocity Dispersion: Application to Fiber Compensation in 1.3–1.6 μm Region", IEEE Journal of Quantum Electronics, Vol. 23, No. 1, January 1987.

In the present invention, the distance $D_1$ between the modulator array 85 and the lens 84, or the distance $D_2$ between the diffraction grating 83 and the lens 84, may be adjusted to provide dispersion compensation. Alternatively, the distance $D_1+D_2$ between the modulator array 85 and the diffraction grating 83 may be adjusted, with the position of the lens 84 remaining the same. As another alternative, the position of the lens 84 could be adjusted while the positions of the array 85 and the grating 83 remain unchanged. As mentioned above, the position adjustment should be made while the optical pulse signal is unmodulated, or modulated by a constant logic high level, such that the time spreading effects of dispersion are isolated from the time spreading effects of modulation. In general, several pulses of the optical pulse signal may have to be modulated with a constant high logic level in order to provide sufficient time to make position adjustments while observing second harmonic signal power in harmonic detector 92. The significance of the logic high level is that, in amplitude-shift keyed modulation techniques, it generally corresponds to a maximum carrier signal power level, such that a carrier signal with a constant logic high level modulation is substantially equivalent to an unmodulated carrier signal. When other modulation schemes are used, the modulation signal levels could be similarly adjusted to provide the substantial equivalent of an unmodulated carrier signal.

The position of the grating 83, array 85 or lens 84 is adjusted in direction X, as described above, until a maximum second harmonic signal power level is detected in second harmonic detector 92. As previously noted, a maximum second harmonic signal power typically corresponds to a minimum amount of pulse time-spreading. When maximum second harmonic power is observed, therefore, the dispersion has been optimally compensated, and a narrower, sharper-edged pulse is produced within the user node 80. After the appropriate adjustment is made and maximum second harmonic signal power is obtained, the various channel signals may then again be modulated by time-varying data signals, as in normal network operation. The dispersion compensation position adjustments could be repeated at regular intervals, such as after transmission of a predetermined number of data packets, to properly compensate for time-varying dispersion effects.

The exemplary user node 80 in FIG. 6 also includes channel alignment capability in accordance with the present invention. As in the dispersion compensation technique described above, a certain time interval is allocated for adjustment of relative positions of the grating 83, lens 84, or array 85 while the channel signals are modulated in a predetermined manner. For channel alignment, the N channel signals are modulated with a predetermined pseudo-random code of length N, with one bit of the code modulated onto each of the N channel signals. The same predetermined pseudo-random code is supplied to the corresponding modulators 86 within the array 85. During the interval in which the optical pulse signal and the modulator array are modulated by the same pseudo-random code, the second harmonic power level detected in harmonic detector 92 is observed. In general, an optical WDM signal with its channel signals modulated by the bits of a pseudo-random code will be spread in time, just as a WDM signal with its channel signals modulated by randomly-varying data signals is spread in time. There will therefore be very little second harmonic power when the optical signal is spread by the pseudo-random code. However, when the pseudo-random code modulated on the channel signals of the incoming WDM signal matches the modulation placed on the channel signals within the modulator array, the original unmodulated optical pulse signal is reproduced, since the modulation of each channel signal is in effect cancelled out. The reproduced unmodulated optical pulse signal has significant power in its second harmonic, which may be detected by the second harmonic detector 92. The second harmonic power level can thus be used to indicate a match, or an alignment, between channel signal wavelengths at the optical source and channel signal wavelengths at the user node 80.

The alignment technique of the present invention ensures that a channel signal corresponding to one channel position at the transmitter does not drift to another channel position at the receiver. During the time interval in which the pseudo-random code is modulated onto the channel signals, the position of modulator array 85 is adjusted in a direction Y substantially perpendicular to the propagation direction of the channel signal path 93 at a point where the channel signals are incident on array 85. In this manner, the individual modulators 86 within array 85 may be made to modulate different channel signals with a particular bit of the pseudo-random sequence. When the bits modulated on the channel signals by modulators 86 in the user node 80 match the bits already modulated on those signals in the transmitter, the original pulse is reconstructed and the second harmonic power measured in the detector 92 will be maximized. If the channel signal wavelengths had drifted such that the channels were each offset by, for example, one channel position at the receiver from their channel positions at the transmitter, the position of array 85 could be adjusted in direction Y by a distance corresponding to one modulator element, or channel position, in which case the original optical pulse again may be properly recombined and detected. Without the adjustment, the channel signals would have been misaligned and the modulated data signals would have been received on the wrong receiver channels. As an alternative, the alignment adjustment could be provided by adjusting the position of grating 83 in direction Y.

The dispersion compensation and channel alignment techniques described above may be implemented using a closed-loop automatic control system, with feedback from the second harmonic detector 92 driving a motor or other adjustment mechanism which varies the position of one or more of the grating 83, lens 84 or array 85 in direction X or direction Y until second harmonic power is maximized. The control system could also control the modulation applied to the channel signals at the central office and within the node, such that an effectively unmodulated optical pulse is incident on the nonlinear crystal 90 during the compensation adjustment, and a pseudo-random code-modulated pulse is used during channel alignment adjustment. After a particular position adjustment is complete, the control system would again permit data signals to modulate the channel signals as in normal operation.

The dispersion compensation and channel alignment techniques are described above in the context of a particular embodiment of a single-source high-density wavelength division multiplexer in an optical network user node, which uses a pulsed optical signal, an array of modulators, and a second harmonic detector. The compensation and alignment techniques may also be used in other optical applications, such as interconnects, and with other types of optical pulse signals. The array 85 may include detectors, reflectors, and other processing elements in addition to or instead of the modulators 86, and may be operated in a non-reflection mode, in alternative embodiments. Furthermore, other harmonics or signal characteristics of the optical signal may be detected to indicate proper compensation or alignment.

Although the foregoing detailed description has described the present invention primarily in terms of particular applications of single-source high-density WDMs, it should be understood that the embodiments discussed are exemplary only. Many variations may be made in the arrangements shown, including the type of optical pulse signal and signal source used, the number of channel signals, the type of wavelength splitters and combiners, and the modulating, demodulating or other signal processing operations performed on the individual channel signals. These and other alternatives and variations will be readily apparent to those skilled in the art, and the present invention is therefore limited only by the appended claims.

We claim:

1. An optical wavelength division multiplexer comprising:

an optical source providing an optical pulse signal having a spectrum comprising a plurality of longitudinal modes of said optical source;

a wavelength splitter for separating said spectrum of said optical pulse signal into a plurality of channel signals, each of said channel signals including a plurality of said modes of said optical source;

at least one modulator for modulating a data signal onto at least one of said channel signals; and a wavelength combiner for recombining said channel signals of said optical pulse signal, at least one of said channel signals having said data signal modulated thereon, to provide a wavelength division multiplexed optical signal.

2. The multiplexer of claim 1 wherein said wavelength splitter and said wavelength combiner are diffraction gratings.

3. The multiplexer of claim 1 wherein said wavelength splitter and said wavelength combiner, together comprise a single diffraction grating.

4. The multiplexer of claim 1 wherein said optical source is a pulsed laser.

5. The multiplexer of claim 1 wherein said optical pulse signal has a pulse duration of less than 1.0 picosecond.

6. The multiplexer of claim 1 wherein said optical pulse signal has a pulse repetition rate of about 100 MHz to 2.5 GHz.

7. The multiplexer of claim 1 wherein said channel signals are separately modulated in an array of modulators, with one modulator in said array modulating one of said channel signals.

8. The multiplexer of claim 1 wherein said modulator is a reflection-mode optical modulator.

9. The multiplexer of claim 1 further including a plurality of optical modulators for receiving said channel signals from said first wavelength splitter and modulating each of said channel signals with a data signal from a first circuit to provide a plurality of modulated channel signals.

10. The multiplexer of claim 9 further including:

a second wavelength splitter for separating said wavelength division multiplexed optical signal, after transmission through an optical transmission medium, into said plurality of modulated channel signals; and a plurality of optical detectors for receiving said modulated channel signals from said second wavelength splitter and demodulating each of said modulated channel signals to provide said data signals from said first circuit to a second circuit.

11. A method of wavelength division multiplexing optical signals, comprising the steps of:

providing an optical pulse signal having a spectrum comprising a plurality of longitudinal modes of an optical source used to generate said optical pulse signal;

splitting said spectrum of said optical pulse signal into a plurality of channel signal; each of said channel signals including a plurality of said modes of said optical source;

separately modulating a data signal onto at least one of said plurality of channel signals; and recombining said channel signals of said optical pulse signal to provide a wavelength division multiplexed optical signal.

12. The method of claim 11 wherein said step of providing an optical pulse signal includes providing a pulse signal having a pulse duration of less than 1.0 picoseconds.

13. The method of claim 11 wherein said step of modulating said channel signal is performed using a reflection-mode optical modulator.

14. The method of claim 11 wherein said steps of splitting and combining are performed using a single diffraction grating.

15. The method of claim 11 further including the steps of:

providing a first circuit having data signals to be connected to a second circuit;

providing a plurality of modulators for modulating said data signals from said first circuit onto said plurality of channel signals, as part of said step of separately modulating at least one of said plurality of channel signals;

transmitting said wavelength division multiplexed optical signal through a transmission medium between said first and said second circuits;

splitting said wavelength division multiplexed optical signal into said plurality of channel signals;

supplying at least one of said modulated channel signals to at least one optical detector for demodulating said modulated channel signal to recover said data signal modulated thereon; and supplying said data signals demodulated from said channel signal to said second circuit.

16. The method of claim 15 further including the step of synchronizing said optical source to a clock signal of said first circuit.

17. A method of wavelength division multiplexing optical signals, comprising the steps of:

providing an optical pulse signal having a spectrum comprising a plurality of longitudinal modes of an optical source used to generate said optical pulse signal;

splitting a spectrum of said optical pulse signal in a wavelength splitter into a plurality of channel signals, each of said channel signals including a plurality of said modes of said optical source;

modulating predetermined logic levels onto at least a subset of said plurality of channel signals in a first array including a plurality of optical modulators;

recombining said channel signals in a wavelength combiner to provide a wavelength division multiplexed optical signal;

applying said wavelength division multiplexed optical signal to a second array in a receiver; and adjusting a parameter of the receiver, to align a given channel signal with a corresponding element of the second array, while said predetermined logic levels are modulated on said channel signals.

18. The method of claim 17 wherein said step of adjusting a parameter further includes the step of adjusting a position of said second array until a power level of a harmonic of said wavelength division multiplexed optical signal, detected in said receiver, reaches a desired value.

19. The method of claim 17 further including the step of detecting a second harmonic power level of said wavelength division multiplexed optical signal in a second harmonic detector of said receiver.

20. The method of claim 17 further including the step of adjusting a position of said second array in a direction substantially parallel to a propagation direction of said channel signals incident on said second array, in order to compensate for chromatic dispersion in an optical transmission medium.

21. The method of claim 17 wherein said step of adjusting a parameter further includes the step of adjusting a position of said second array in a direction substantially perpendicular to a propagation direction of said channel signals incident on said second array.

22. The method of claim 17 wherein the step of modulating predetermined logic levels further includes the step of modulating each of said channel signals with a constant modulation signal level during said step of adjusting said parameter of the receiver.

23. The method of claim 17 wherein said step of modulating predetermined logic levels on said channel signals further includes the step of modulating a pseudo-random code sequence on said channel signals.

24. The method of claim 17 wherein said step of adjusting a parameter further includes the step of adjusting a position of at least one of a wavelength splitter in said receiver, a wavelength combiner in said receiver, or a lens located between said second array and one of said receiver splitter and said receiver combiner until a power level of a harmonic of said wavelength division multiplexed signal, detected in said receiver, reaches a desired value.

* * * * *